United States Patent [19]

Patel

[11] Patent Number: 5,630,358
[45] Date of Patent: May 20, 1997

[54] COUNTERTOP APPLIANCE FOR MAKING DISC-SHAPED EDIBLES

[76] Inventor: Chandulal Patel, 10 Sai Kripa Soc., Watertank, Anandnagar, Baroda-22 Gujarat, India

[21] Appl. No.: 337,893

[22] Filed: Nov. 14, 1994

[51] Int. Cl.⁶ .............................. A21C 3/04; A47J 27/12; A47J 37/00; A47J 39/00
[52] U.S. Cl. .................. 99/349; 99/348; 99/353; 99/423; 100/303
[58] Field of Search .................. 99/331, 342, 348, 99/349, 375–379, 390, 353–355, 372, 373, 422, 423, 425; 100/93 P, 144, 153; 366/69, 77, 91, 99, 188, 189, 194, 290, 310; 425/194, 267, 363, 394, 418, 367, 335, 373; 426/19, 504, 524, 496, 516

[56] References Cited

U.S. PATENT DOCUMENTS

| | | | |
|---|---|---|---|
| 3,880,064 | 4/1975 | Martinez | 99/349 |
| 3,972,672 | 8/1976 | Castro | 425/367 |
| 4,173,926 | 11/1979 | Brignall | 99/353 X |
| 4,197,792 | 4/1980 | Mendoza | 99/349 |
| 4,241,648 | 12/1980 | Longenecker | 99/355 X |
| 4,281,025 | 7/1981 | Longenecker | 426/496 |
| 4,465,700 | 8/1984 | Ball | 426/504 |
| 4,504,152 | 3/1985 | Moller | 366/188 |
| 4,630,930 | 12/1986 | Seiling | 366/77 |
| 4,664,025 | 5/1987 | Martinez | 99/331 |
| 4,683,813 | 8/1987 | Schultz | 99/353 |
| 4,724,755 | 2/1988 | Escamilla | 99/448 X |
| 4,806,090 | 2/1989 | Finlay | 425/194 |
| 4,838,152 | 6/1989 | Escamilla et al. | 99/423 X |
| 4,905,581 | 3/1990 | Kirkpatrick | 100/45 X |
| 4,938,126 | 7/1990 | Rubio et al. | 99/423 X |
| 4,987,827 | 1/1991 | Marquez | 99/331 |
| 5,095,813 | 3/1992 | Escamilla | 99/349 |
| 5,231,919 | 8/1993 | Lawrence et al. | 425/167 X |
| 5,272,962 | 12/1993 | Kageyama | 99/353 |
| 5,388,503 | 2/1995 | Buerkle | 100/151 X |
| 5,501,140 | 3/1996 | Balleza et al. | 100/93 P |

*Primary Examiner*—Timothy F. Simone
*Attorney, Agent, or Firm*—Gene Scott; Patent Law & Venture Group

[57] ABSTRACT

A countertop appliance for automatically making a plurality of disk-shaped edibles comprising a dough maker for mixing and kneading the desired dough ingredients, the dough maker having a discharge valve that releases a portion of the mixed dough onto one of four circular platens of a transfer carousel. The platens rotate in a circular plane, so that once a dough portion is dropped to the platen, the transfer carousel rotates the platens, and in the next position a shaper plate flattens the dough portion on a platen. When a dough portion is properly shaped, the platen is rotated to a position where it inverts and the dough is dropped onto a conveyor. The conveyor moves the dough portions along a path, past heating elements that cook the dough, until the finished cooked dough products are dropped from the conveyor.

4 Claims, 2 Drawing Sheets

COUNTERTOP APPLIANCE FOR MAKING DISC-SHAPED EDIBLES

FIELD OF THE INVENTION

This invention relates generally to a food preparation machine and more particularly to a machine capable of mixing ingredients, flattening the resulting dough to a selectable thickness and shape and cooking it, thereby completely automating the process of making tortillas, crepes, chapati, roti, and numerous other dough-based food products.

BACKGROUND OF THE INVENTION

Invention and use of devices to aid in food production is known to the public. Currently available is a whole array of automated mixing, flattening, and cooking devices designed to simplify the production process of flat dough products such as tortillas, puri, papadam and chapati.

Commonly known mixing devices include beaters, blenders, and food processors. While these devices are capable of mixing together a wide variety of various ingredients, they are often incapable of appropriately mixing and kneading ingredients in the fashion necessary to produce dough. To fulfill this need, several special mixing devices are designed specifically to produce dough.

One such dough mixer is detailed in U.S. Pat. No. 4,630,930 by Samuel O. Seiling in 1986. This invention mixes the desired ingredients at a high rate of speed in a first chamber. The blending of ingredients is performed by a helical shaped agitator without a central shaft which rotates to force the mix toward one end of the chamber. A common hatchway between the chambers is opened and the agitator spirals to force the mix toward one end of the chamber. A common hatchway between the chambers is opened and the agitator spirals to force the mix through the opening into the second chamber for further development of the mix. After the completion of the developing cycle, the fully prepared dough is exhausted from the chamber by two rotating roller bars which substantially pulls the entire mass from the chamber leaving limited waste behind. Each segment of the cycle is performed continuously so that a new fully developed dough batch is readied every one-half cycle time. U.S. Pat. No. 4,504,152 to Moller et al. in 1985 and U.S. Pat. No. 4,465,700 to Kenneth Ball in 1984 detail similar dough mixing devices.

While these devices are convenient for mixing dough ingredients, and are a substantial improvement over manual kneading, they are limited to merely mixing ingredients, and thereby still require the user to manually flatten the dough with a rolling pin or the like. Since this flattening process can be rather time consuming and strenuous, several dough flatteners have been invented.

An example of a flattening device is detailed in U.S. Pat. No. 4,806,090 issued to Patrick Finlay in 1989. This device comprises a turntable defining a planar surface and a conical roller means adapted to cooperate with the turntable and define a rolling line in the region of the roller close to the planar surface. The turntable is rotatable to permit effective movement between the rolling line and the turntable. The apparatus further includes a means to cause the roller and turntable to move from a relative spaced apart position to an operative position with a reduced spacing for a predetermined operational period of time.

Other flattening device embodiments include U.S. Pat. No. 4,683,813 issued to George Schultz in 1985, and U.S. Pat. No. 3,972,672 issued to Thomas Luke in 1976. Schultz' device flattens portions of dough by pressing them between a rotatable disc and a press plate, while Luke's invention flattens dough portions by means of a band that passes through two or three pulleys, thereby squeezing the dough between the pulleys.

While these, and other similar devices can effectively flatten dough, they often have several disadvantages. First of all, these devices can often only accommodate small dough portions for buns or the like, and cannot flatten a portion large enough to be formed into larger products, such as tortillas. In addition, many of these devices do not include means for adjusting the thickness of the flattened dough. Thus, all dough products to be flattened must be of a singular thickness, which is not always desirable in the production of several different products. And finally, all such flatteners are limited in that they are capable only of flattening pre-kneaded dough. As such, while these devices effectively eliminate the need for manual rolling-pin flattening, they still require that the user manually knead the dough ingredients before employing the use of the flattener.

To remedy the lack of device capability and capitalize on the advantages of both mixing devices and flatteners, Minoru Kageyama et al. introduced an apparatus capable of both mixing ingredients and flattening the resulting dough into a single sheet in U.S. Pat. No. 5,272,962 issued in 1993. In this device, the dough ingredients are mixed with particles of ice, such that the particles of ice do not melt, thereby making a dough mixture. This mixture is then pressed from the machine, onto a conveyor belt and formed into a continuos belt-like dough mixture having a uniform width and thickness. When the ice particles are melted, the dough mixture is hydrated and stretched so that a continuos sheet of dough having a gluten network is provided. However, a substantial disadvantage of this apparatus is that again the thickness of the flattened dough cannot be adjusted, thereby necessitating that all dough products be of the same thickness. In addition, unless the dough is to be made into a product requiring long sheets of dough, such as some pizza crusts or pastas, the resulting sheet of dough must be reshaped and additionally flattened or thickened in accordance with its particular manifestation.

The invention of simultaneous flattening and baking devices has eliminated the need for these flatteners in the production of tortillas and the like, as they accept a ball of dough. One such device, issued in U.S. Pat. No. 3,880,064 to Maria Navar Martinez in 1975, functions similarly to commonly used waffle irons and the like. This invention allows dough balls to be placed on an electrically heated base plate. A lid plate is hinged to the base plate and includes an extending handle bar which serves as a lever in raising and lowering the lid plate to disengage or engage with the base plate. As downward pressure is applied to the lid plate, the dough ball is flattened between the two plates. The two plates are held together until the desired cooking of the flattened dough is achieved. This invention is especially designed to flatten and cook tortillas, crepes and wafers.

U.S. Pat. No. 4,281,025 issued to John Longenecker in 1981 details a method for shaping and precooking tortilla dough that allows a portion of dough to be inserted into a region between the arcuate outer surface of a heated rotatable drum and the arcuate surface of a heated compression plate. The plate is pivotally mounted and swung into position parallel to the surface of the drum to compress the dough while the drum is in a stop-phase of step motion. Thereafter, the plate is swung out of position and the drum is then rotated to cause the compressed dough to pass under the pivotally fixed end of the plate and out of the region.

Another device that allows for simultaneous flattening and cooking of dough portions is detailed by Robert Escamilla et al. in U.S. Pat. No. 5,095,813 in 1992. This invention includes a pair of cooperating heating and pressing plates that are mounted between vertical side frames of a supporting frame structure. The one heating and pressing unit is fixedly mounted at an angle to the horizontal sufficient to insure the gravitational discharge of the baked tortilla. The movable plate is shifted by a manually operable cam.

These and other like devices provide a convenient means for shaping, flattening and cooking tortillas and other similar food products. However, many of these devices are limited in their capabilities. For example, the above mentioned devices are only able to produce one tortilla at a time. Thus, a new ball of dough cannot be placed in the device until the previous tortilla is completed. This is inconvenient for quick use, and especially undesirable in meal preparation, as it results in the initial tortillas being cold by the time the entire batch of dough has been shaped and cooked. In addition, these devices are not convenient for producing a large batch of dough, as the user must be present at all times to monitor the device, remove cooked products, and add new dough portions to the apparatus. And finally, these devices face drawbacks in that they are only capable of accepting premixed dough, thus necessitating manual kneading of the dough prior to use.

Thus, for maximum ease and convenience, a user would have to employ the use of both a mixing device and a flattening/cooking device. Not only is this expensive and space ineffiecient, but by using two independent devices, the system of producing a food product is limited by the disadvantages of both devices.

The present invention allows all these functions to be accomplished through one integrated machine that provides all of the advantages and none of the disadvantages of the prior art. The present invention provides further related advantages as described in the summary below.

SUMMARY OF THE INVENTION

The present invention is a fully automated, countertop appliance designed to mix, flatten, shape and cook dough in order to conveniently produce tortillas, crepes, chapati and other dough products with characteristics selected by the user.

The invention includes a dough maker, carousel, shaper, conveyor, heating assembly, and programming module. The programming module consists of a microprocessor that can be programmed by the user to control the size, thickness and the cooking time of the completed product. Once the desired information has been programmed into the programming module, a detachable mixing bowl is loaded with the desired ingredients and positioned in the dough maker. The dough maker's motor rotates a blade for a programmed amount of time to insure proper mixing. The bowl is then momentarily pressurized and a discharge valve is opened for a predetermined time to permit a portion of the dough to be discharged onto the carousel.

The carousel consists of four or more non-stick platens spaced 90 degrees apart from each other. A carousel platen receives the discharged dough and the carousel rotates so that the platen is now positioned directly under the shaper. A shaper plate moves vertically downward, contacting the platen until the dough is flattened to a programmed thickness. Once the desired thickness has been achieved, the carousel rotates another 90 degrees and this platen is now in a preheat position, allowing the flattened dough to be dried and pre-heated if necessary, prior to discharge onto the conveyor. As the carousel platen moves to a final position, it rotates so as to drop the flattened dough onto the conveyor. The conveyor acts to move the dough past an upper and lower heater at a programmed speed to allow the proper time for baking. Heat barriers may be placed near the beginning and end of the conveyor to form a nearly enclosed oven. After passing the last heat barrier, the product passes under a final dispenser which may dispense butter onto the product, and is then discharged to a receptacle for completed product.

Thus, it is an object of the present invention to improve upon all prior art by providing a single machine that can effectively knead, flatten and cook a flat food product, thereby eliminating the need for several pieces of equipment or manual kneading or flattening to produce tortillas, chapati, roti or the like.

It is another object of the invention to provide a faster, more efficient device by allowing several products to be in-progress simultaneously. This is accomplished by including a rotating carousel that allows product to be continually processed, with a new batch of dough dropping from the dough maker to a carousel platen, and a flattened, ready-to-be-cooked product falling from a platen onto the conveyor each time the carousel rotates 90 degrees. This drastically reduces the amount of time it takes to process an entire batch of dough.

It is another object of the invention to further reduce the amount of work required by the user by automatically separating the dough into appropriate portions, thereby eliminating the need for the user to feed the machine appropriate sized dough balls.

It is another object of the invention to provide the user greater control over the finished product by including a programming module by which the user can control the variables of the process. While the prior art is capable of producing products of only one consistency, the instant invention can make products of varying thickness and cooking times. This is especially beneficial when the device is to be employed to produce several different types of food products with individual thicknesses.

It is another object of the invention to allow for improved taste and smoothness by allowing butter or oil to be sprayed on the finished, warm product before it reaches the end of the conveyor.

It is a further object of the invention to be of compact design so as to easily fit on a countertop or the like and provide a convenient production method for household, restaurant, hotel and other uses.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
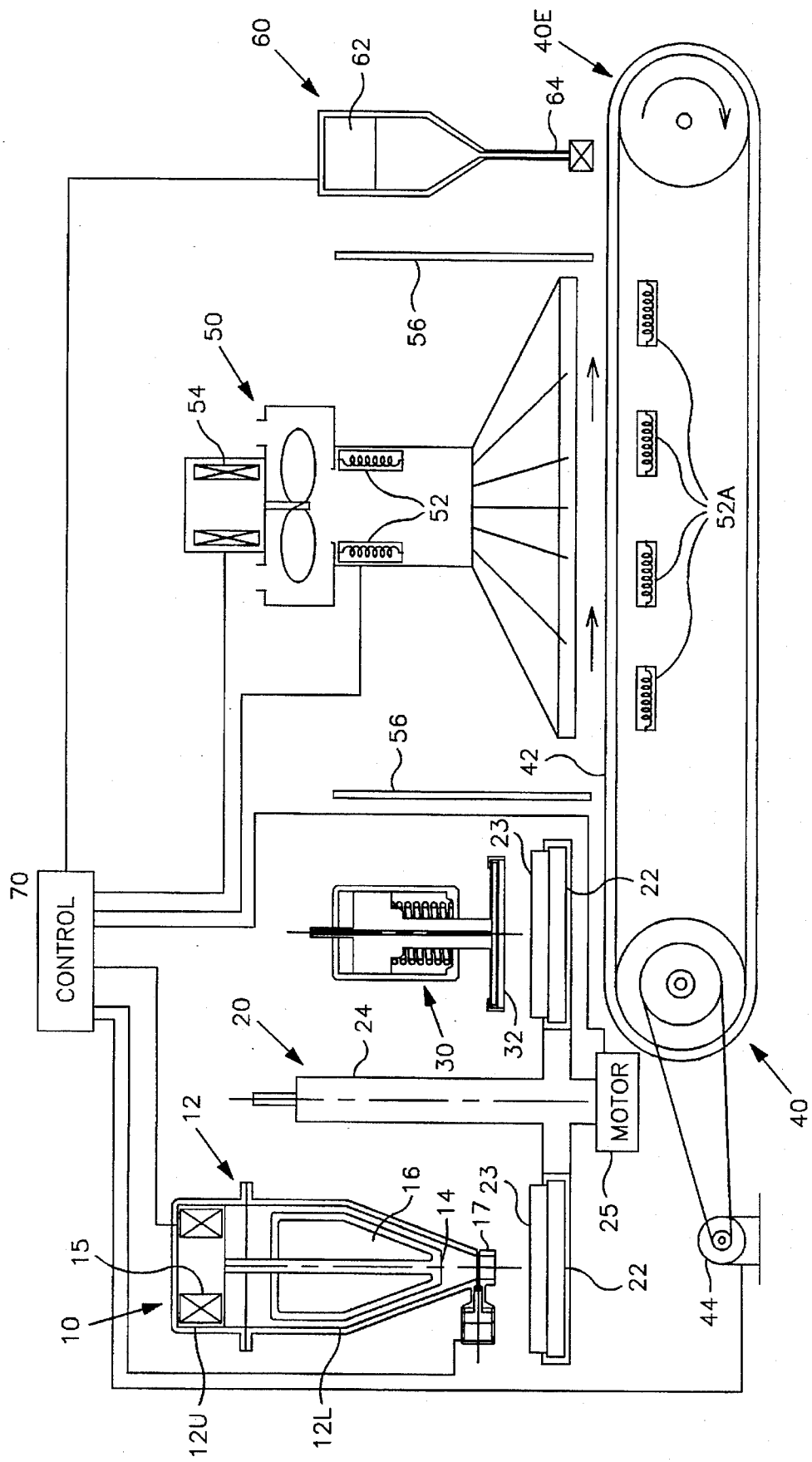
FIG. 1 is a schematic representation of the present invention showing the various elements and their interrelationships.
Figure 2:
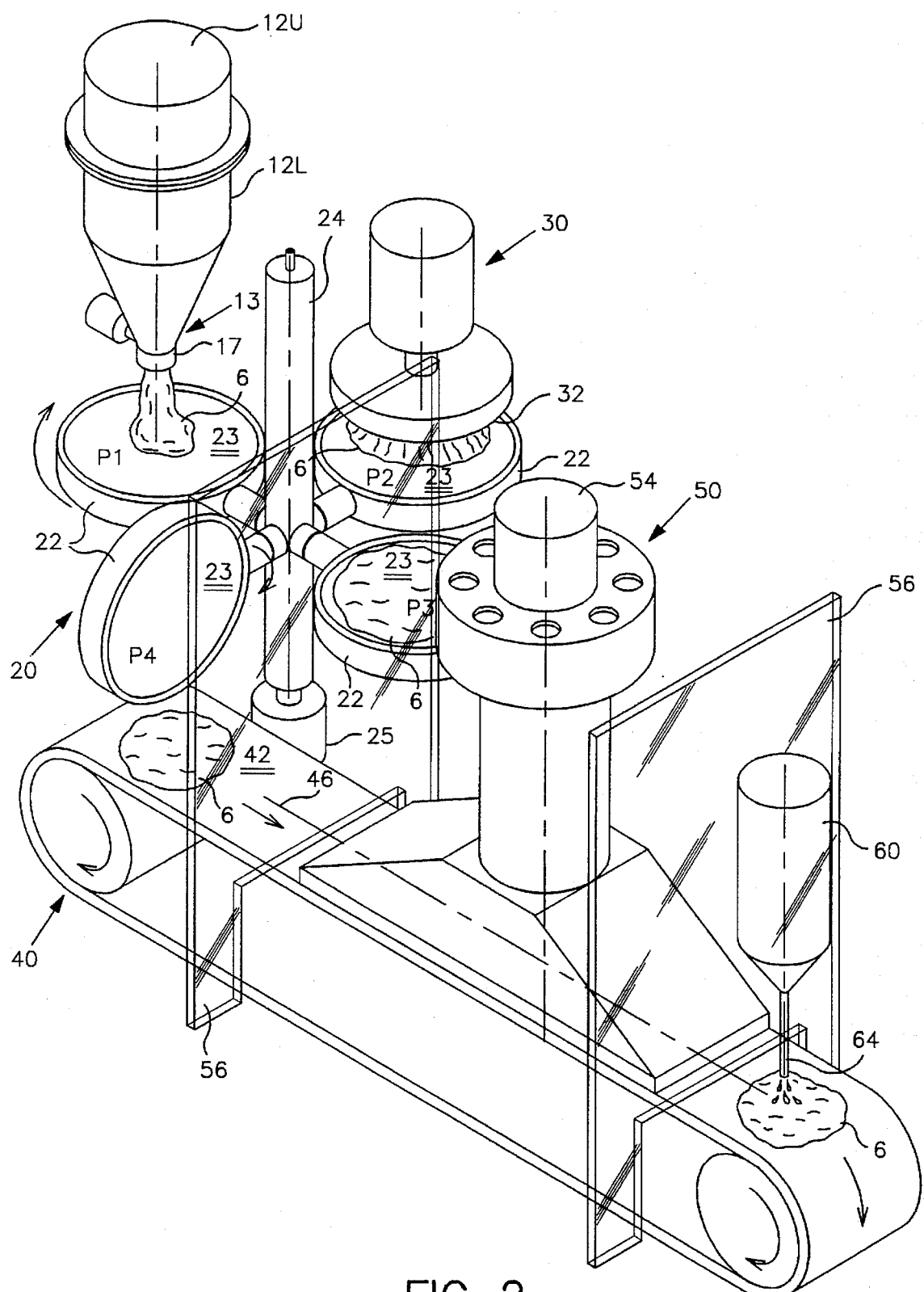
FIG. 2 is a perspective view of the invention of FIG. 1 in an embodiment for making flattened food products and dipicting the various elements of the invention in general block form.

FIGS. 1 and 2 show an appliance for making tortillas, crepes, roti, chapati, puri and many other disc-shaped edibles. The appliance is fully automatic, quickly turning raw dough ingredients into a finished shaped and cooked edible product. The appliance is also extremely compact so that it can be stored on a countertop or shelf, thereby making it ideal for household or commercial use.

The basic components of the appliance are a dough maker 10, a transfer carousel 20, a shaper plate 30, a conveyor 40 and a heating assembly 50. A programmable control means 70 is also interconnected with the appliance. The control means 70 allows the user to easily select the size and thickness of the finished products by programming the control means 70 to control and sequence the various components of the appliance so that a logical sequence of events occur in producing numerous edible food products.

The dough maker 10 includes an outer shell 12 that is divided into a lower portion 12L and an upper portion 12U. The lower portion 12L houses a removable mixing bowl 14 within it, and the upper portion 12U is designed to engage with and cover the lower portion 12L. The dough maker 10 also includes a drive motor 15 with an attached blade assembly 16. The blade assembly 16 extends downwardly from the drive motor 15 into the mixing bowl 14, where it mixes and kneads the desired dough ingredients into a singular dough mixture. A discharge valve 17 is included at a lower end 13 of the dough maker's lower portion 12L. When the blade assembly 16 has thoroughly mixed the dough ingredients, the discharge valve 17 begins to drop portions of the dough mixture from the dough maker 10 to the transfer carousel 20.

The transfer carousel 20 is designed to transport the dough portions through several stages of development. As shown in the FIGS. 1 and 2, preferably the carousel is composed of four congruent circular platens 22 that are arranged around a rotating vertical drive shaft 24, so that each of the four platens 22 are located 90 rotational degrees away from the next in each of four positions P1, P2, P3 or P4. The drive shaft 24 is rotatably secured to a first prime mover 25, so that all the platens 22 simultaneously rotate in a circular plane, each platen 22 moving 90 degrees around the drive shaft 24 into the next of the four rotational positions, P1, P2, P3 and P4. Each platen 22 includes an upfacing support surface 23 so that when the discharge valve 17 of the dough maker 10 drops a dough portion 6, the dough portion 6 falls on the upfacing support surface 23 of the platen 22 located in the first rotational position P1 under the dough maker 10. However, the transfer carousel 20 might also be constructed as a conveyor-type assembly, or it could include more platens for increased dough volume, or fewer platens for relatively low volume needs.

When the first prime mover 25 rotates the carousel 20, the platen 22 with the dough portion 6 in the first rotational position P1 rotates 90 degrees into the second rotational position P2 under the shaper plate 30. The shaper plate 30 has a downwardly facing press surface 32 positioned directly above the platen 22 in the second rotational position P2. The shaper plate 30 is movable by means of compressed air, and, when activated, moves downwardly so that the press surface 32 moves closely to the platen's upfacing support surface 23, thereby flattening and shaping the dough portion 6 between them. While the preferable embodiment of the shaper, as seen in FIGS. 1 and 2 and detailed above, is that of a circular platen, the dough can alternately be shaped and flattened with a roller assembly. A roller would be especially beneficial for shaping sticky flour dough products, such as papadam and mathia.

The transfer carousel 20 is again rotated, moving the flattened dough portion 6 into the third rotational position P3 where the dough may be dried or preheated. When each platen 22, in turn, reaches the fourth rotational position P4, the first prime mover 25 tilts it so that the dough drops from its upfacing support surface 23. The dough drops from the platen in the fourth position P4, onto a conveying surface 42 of the conveyor 40. The conveyor 40 includes a second drive means 44 that moves the dough portions 6 in a path 46 away from the transfer carousel 20 toward the heating assembly 50. Preferably, the conveyor 40 is constructed of stainless metal chain or wire so as to permit an open area of at least 50% for allowing the passage of hot air.

The heating assembly 50 has heating elements 52 positioned above and below the conveyor surface 42, so that the dough portions 6 are cooked as they move along the path 46. The heating assembly can take numerous forms, but preferably the heating elements 52 heat by radiation as well as convection, and the heating element 52A below the conveying surface 42 is preferably replaceable. A fan 54 is also positioned in the heating assembly 50. The fan 54 blows heated air on the dough portions 6 on the conveyor surface 42 to accelerate the cooking and drying of the portions 6. A heat barrier 54 may be placed at the beginning and the end of the conveyor to form a nearly enclosed oven, thereby allowing more efficient cooking of the dough portions 6.

An automatic dispenser 60 is positioned over the conveyor surface 42 on the path 46. The dispenser has a storage space 62 that contains an edible product, such as butter, sugar or oil. A dispensing nozzle 64 of the dispenser 60 applies the edible product onto the dough portions 6 when the conveyor 40 moves them directly below the dispenser 60.

Thus, in operation, the method of automatically making disc-shaped edible food products consists of several steps.

First, the user sets the desired size and thickness of the food product with the central control device 70 that automatically controls and sequences the workings of the appliance.

Next, the mixing bowl 14 is removed from the dough maker 10 and the desired dough ingredients are placed in the bowl 14. The bowl 14 is returned to its proper position in the lower portion 12L of the dough maker 10, and upper portion 12U is engaged with the lower portion 12L so that it covers the lower portion 12L.

When a ready signal is given to the central control device 70, the blade assembly 16 that extends downwardly from the drive motor 15 into the mixing bowl 14 begins mixing and kneading the dough ingredients into a single batch of dough.

After a fixed mixing time period, preselected by the user depending upon the desired consistency of the product being processed, the dough maker's discharge valve 17 opens for a predetermined time period so that a corresponding sized dough portion 6 drops from the dough maker 10 onto the upfacing support surface 23 of the platen 22 located in the first rotational position P1 under the dough maker 10. Each time the first prime mover 25 rotates the carousel 20, the discharge valve releases another dough portion 6 onto the next platen 22 located in the first rotational position P1.

Thus, when first prime mover 25 rotates the transfer carousel 20 again, the platen with the dough portion 6 moves into the second rotational position P2 under the shaper plate 30, while another platen 22 moves into the first rotational position P1. While another dough portion 6 is released onto the second platen, the press surface 32 of the shaper plate 30 engages the upfacing support surface 23 of the first platen 22, thereby shaping and flattening the dough portion 6. Each time the carousel 20 rotates, the shaper plate 30 flattens the dough on the next platen 22 in the second rotational position P2.

As such, when the carousel 20 rotates again, the first platen 22 moves into the third rotational position P3 where the flattened dough portion 6 is dried and preheated if desired, while the second platen 22 moves into the second position P2 where its dough portion 6 is flattened, and a third platen 22 moves into the first position P1 to receive a dough portion 6 from the dough maker 10.

When the carousel 20 rotates another time, a fourth platen 22 recieves dough portion 6 at the first position P1, the dough portion 6 on the third platen 22 is flattened as it is in the second position P2, and the second platen 22 is in the third position. The first platen 22, now in the fourth rotational position P4, is positioned over the conveyor 40. The first prime mover 25 tilts the first platen 22 so that its flattened dough portion 6 drops onto the conveying surface 42. Each time the carousel 20 rotates, the platen 22 located in the fourth position P4 is tilted so that the dough portion 6 drops onto the conveyor.

Thus, when the carousel 20 rotates again, the empty first platen 22 once again moves into the first rotational position to receive a new dough portion 6, thereby starting a repetative cycle over once more. Thus, this rotational cycle of the platens 22 continues on until the dough supply in the dough maker 10 is exhausted or until demand has been exhausted.

As each flattened dough portion 6 is dropped onto the conveyor, the conveying surface 42 moves it on the path 46 through heating assembly 50. Heating elements 52 and 52A automatically heat the portions 6 from above and from below and a fan 54 automatically blows hot air onto the portions 6 as they move along the path 46, until each of the portions 6 is cooked. The conveying surface 42 moves the cooked portions 6 away from the heating assembly 50, and an edible product such as butter or oil can be dispensed onto them when the conveyor 40 moves them directly underneath the dispenser 60.

After this, the dough portions 6 are removed from the conveyor 60 or arrive at its end 40E, and are ready to be comsumed. The process and method described above has as many variations as there are recipices for flat food products, but all steps must be synchronized. The carousel is limited in how fast it may discharge portions 6 onto the conveyor 40 by how fast the portions can be cooked thereon.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A countertop appliance for automatically making a plurality of disc-shaped edibles comprising:

a dough maker having an outer shell including a lower portion having a removable mixing bowl within, and an upper portion configured for covering the lower portion and engaging therewith, and including a drive motor engaging a blade assembly extending downwardly from the drive motor into the mixing bowl to mix and knead a dough mixture placed within the mixing bowl, the lower portion including a discharge valve at a lower end thereof for dropping a plurality of portions of the dough mixture;

a transfer carousel having a plurality of platens, each with an upfacing support surface, the platens arranged on a rotating vertical drive shaft rotatably engaged with a first prime mover for moving the patens in circular rotation in a plane so that each of the platens in a first rotational position, passes under the dough maker to receive one of the dough portions, and for tilting any one of the platens so that the upfacing support surface is in a non-horizontal attitude for dropping the dough portion;

a pneumatically actuated shaper plate having a downwardly facing press surface positioned for engaging the upfacing support surface of each of the platens at a second rotational position of the carousel, the dough portion being flattened and shaped thereby;

a conveyor having a conveying surface positioned for receiving the flattened dough portions as dropped from the platens, and including a second drive means for moving the portions in a path;

a heating assembly having heating elements positioned above and below the conveyor surface along the path for cooking the portions as each moves along the path.

2. The appliance of claim 1 further including an automatic dispenser positioned over the conveyor surface on the path and having a storage space for holding an edible product, and a dispensing nozzle for applying the edible product onto the portions when the portions are positioned below the dispenser.

3. The appliance of claim 1 further including a fan positioned in the heating assembly for blowing heated air onto the portions on the conveyor surface to accelerate cooking and drying of the portions thereon.

4. The appliance of claim 1 further including a programmable control means interconnected with the appliance for controlling and sequencing the dough maker, the discharge valve, the carousel, the shaper, the conveyer, the heaters and the dispenser such that a logical sequence of events occur in producing each of a plurality of portions in sequence.

* * * * *